Sept. 7, 1954      S. MARKELL      2,688,273
SEMIRIMLESS SPECTACLE MOUNTING
Filed Sept. 2, 1953
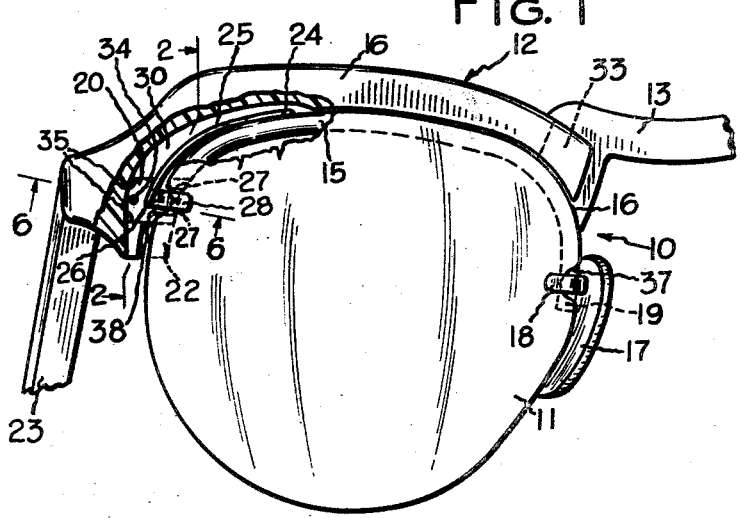
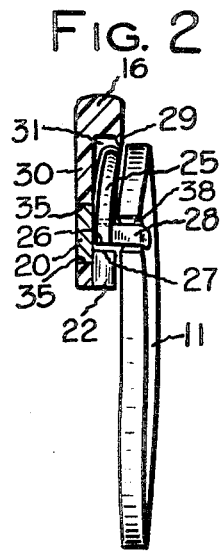
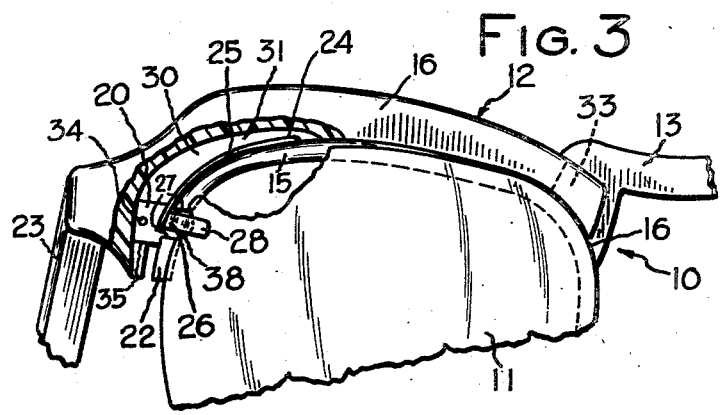
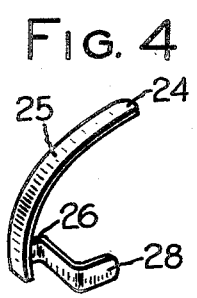
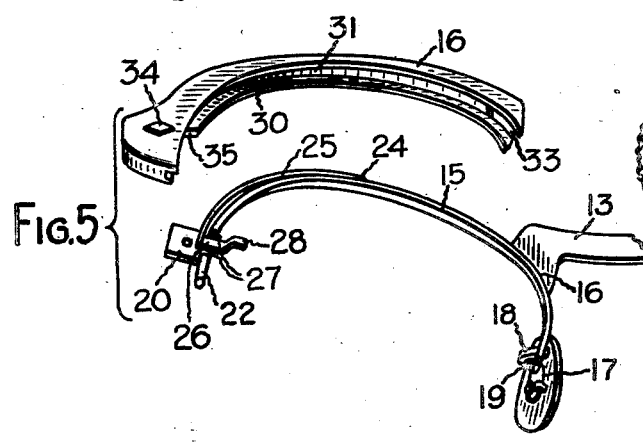
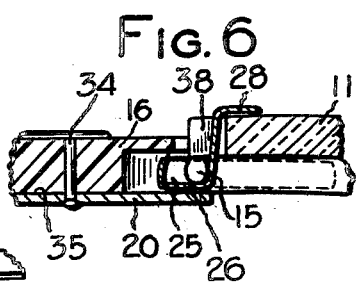
INVENTOR.
STANLEY MARKELL
BY
ATTORNEY Patented Sept. 7, 1954

2,688,273

UNITED STATES PATENT OFFICE 2,688,273

SEMIRIMLESS SPECTACLE MOUNTING

Stanley Markell, Rochester, N. Y., assignor to Bausch & Lomb Optical Company, Rochester, N. Y., a corporation of New York Application September 2, 1953, Serial No. 378,097

3 Claims. (Cl. 88—47)

This invention relates to spectacle mountings and more particularly it has reference to spectacle mountings of the combined metallic, non-metallic semi-rimless type.

One of the objects of this invention is to provide an improved spectacle mounting of the type described having means to facilitate the removal or insertion of a lens.

Another object of this invention is to provide a spectacle mounting of the type described having resilient means for detachably holding the lenses on the mounting.

A further object of this invention is to provide a spectacle mounting having the decorative effect of a partial non-metallic rim combined with the advantages of a resilient lens fastening means.

A still further object of this invention is to provide a spectacle mounting of the type described having a construction that is practical and economical to manufacture.

Other objects and advantages pertaining to the construction of the spectacle mounting and to the form and relation of elements thereof will more readily appear from the following description taken in connection with the accompanying drawings.

Fig. 1 is a partial front elevation of my new spectacle mounting with portions broken away and shown in section.

Fig. 2 is a sectional view taken along the line 2—2 in Fig. 1.

Fig. 3 is a partial front elevation thereof with parts in section and with the temporal portion of the mounting pulled upwardly with respect to the lens.

Fig. 4 is a perspective view of a resilient strip with attached clip forming part of my invention.

Fig. 5 is a perspective exploded view of the principal elements of my invention.

Fig. 6 is a sectional view taken on the line 6—6 of Fig. 1.

A preferred embodiment of my invention is shown in the drawings wherein 10 indicates, generally, a fragmentary portion of a semi-rimless spectacle mounting comprising a lens 11 and a lens supporting frame or brow bar 12, the nasal portion of which is attached to one end of a bridge member 13.

The lens supporting frame 12 is composed of two major parts, namely, a relatively rigid metallic lens bar 15 extending along and at the rear of the top edge and partially down the temporal edge of the lens 11 and a non-metallic plastic rim part 16 which lies substantially coextensive with the metallic lens bar 15.

The relatively rigid metallic lens bar 15, being connected at 16 to the bridge member 13, as by soldering or the like, extends below said bridge member into supporting relation for both a nose pad assembly 17 and a forwardly projecting fixed lens clip 18. Said lens clip 18 is fastened above the end of the lens bar 15 so that an extension 19 of the lens bar projects below the clip 18 in backing relation for the lens. Said lens bar 15, being fastened above its temporal end to the front face of hinge plate 20, has an extension 22 projecting below said hinge plate also in backing relation for the lens. The extensions 19 and 22 act in such a way as to prevent rotation of the lens 11 about an axis running through the lens fastening means, to be better understood hereinafter. Hingedly secured to the hinge plate 20, and extending rearwardly therefrom, is a fragmentary portion of a temple member 23 of conventional construction.

Attached at one end 24 to the upper side of the lens bar 15 and extending substantially parallel thereto in a temporal direction is a substantially flat, resilient strip 25 which has an arm 26 projecting inwardly from the temporal end thereof in overlying relation to the hinge plate. Said arm 26, extending through an opening 27 in the lens bar 15, has attached to its inner end a lens clip 28 which is disposed in lens engaging relation. When the lens clip 28 is forced in the temporal direction, it will slide the arm 26 on the hinge plate 20 through the opening 27 thereby pivoting the strip 25 about its fixed end 24 against the resilience of the strip. The resilient strip 25 is so positioned with respect to the lens bar 15 that it will normally lie along the outer edge of said bar 15 to urge the clip 28 inwardly toward the bridge portion of the frame.

The rim part 16, formed of a suitable non-metallic plastic material, extends along the top and partially encases the relatively rigid lens bar 15 from the bridge member to a point slightly beyond the hinge plate 20 so as to partially encase said hinge plate. A lip 29 depends downwardly from the forward edge of the rim part 16 which has a rear wall 30 downwardly depending from the rearward edge thereof. The lip 29 and wall 30 on the lower side of the rim part 16 form a groove 31 which increases in depth adjacent the temporal end thereof. The groove 31, within which the lens bar 15 is partially seated, is adapted to receive the resilient strip 25 in nesting relation within the deeper portion of the groove so that the resilient strip can be pivoted about its fixed end 24 into the deeper portion of the groove.

The bridge portion of the non-metallic rim part 16 is mounted coextensive with the metallic lens bar 15 and has a slot 33 which engages over a portion of the bridge member 13 and is fastened thereto by a rivet or the like. The temporal portion of said non-metallic rim part 16 is fastened to the metallic lens bar 15 and to the hinge plate 20 by a rivet 34 which holds the hinge plate partially encased in a recess 35 in the rim part. In this way, the non-metallic rim parts are neatly and efficiently fastened to the metallic lens bar in such a way that the working parts of my improved spectacle mounting are substantially concealed from view.

The lens member 11 is cut and edged and provided with two notches 37 and 38 appropriately cut into the respective nasal and temporal edges thereof. When a lens is assembled on the frame, the clip 18 is engaged with the notch 37 and the clip 28 is engaged with the notch 38. The lens bar 15 acts as a backing for the lens 11 above the clips while the extensions 22 and 19 of the lens bar, that project below the clips 28 and 18, act as a backing below the clips to thereby prevent the lens from pivoting about the axis of the lens that passes through the clips.

To assemble or remove a lens from the frame, it is only necessary to apply pressure to the clip 28 in a temporal direction which will force the resilient strip and its attached clip into the groove in the non-metallic rim part and free the clip from notch 38 whereby a lens may be inserted or removed from the mounting.

Various modifications can obviously be made without departing from the spirit of my invention as pointed out in the appended claims.

I claim:

1. In a semi-rimless spectacle mounting, the combination of a relatively rigid metallic lens bar fastened to a bridge member, a hinge plate fastened to the temporal portion of the lens bar, a non-metallic rim part overlying the metallic lens bar and connected to the bridge and the hinge plate, the lower side of the non-metallic rim part having a groove formed therein increasing in depth adjacent the temporal end thereof, said lens bar being positioned in said groove, a lens, means for detachably securing the lens to the lens bar, said means comprising an elongated resilient strip attached at one end to the upper side of the lens bar and lying substantially parallel thereto within the groove in the non-metallic rim part, an arm attached to the temporal end of the resilient strip in overlying relation to the hinge plate and projecting inwardly through an opening in the metallic lens bar, a clip attached to the arm and normally projecting into engaging relation with a notch in the temporal portion of the lens and a second clip projecting inwardly from the bridge portion of the lens bar for engaging with a notch in the nasal portion of the lens whereby pressure in the temporal direction on the first-named clip forces the resilient strip into the deeper portion of the groove and releases the lens from the spectacle mounting.

2. In a semi-rimless spectacle mounting, the combination of a lens, a relatively rigid metallic lens bar extending along the upper and temporal edge of a lens, a non-metallic rim part extending along the top and down the temporal side of the lens bar, the non-metallic rim part having a groove formed in its lower side increasing in depth adjacent the temporal end thereof, said lens bar being positioned in said groove, a metal bridge, one end of the bridge being fastened to the lens bar above the nasal end thereof to provide an extension of the lens bar below said bridge, a hinge plate fastened to the lens bar above the temporal end thereof to provide an extension of the lens bar below said hinge plate, an elongated resilient strip attached at one end to the upper side of the lens bar and lying substantially parallel to the temporal portion thereof within the groove in the non-metallic rim part, an arm attached to the temporal end of the resilient strip in overlying relation to the hinge plate and projecting inwardly through an opening in the lens bar, a lens clip attached to the arm and projecting into engaging relation with a notch in the temporal portion of the lens, and a second lens clip projecting inwardly from the lens bar above the nasal end thereof for engaging in a notch in the nasal portion of the lens, whereby the extensions of the lens bar below the clips prevent rotation of the lens about an axis through the clips.

3. In a semi-rimless spectacle mounting, the combination of a relatively rigid metal lens bar, a metal bridge, one end portion of the bridge being connected to the nasal portion of the lens bar, a hinge plate connected to the temporal portion of the lens bar, a non-metallic rim part connected in overlying relation to the lens bar, the lower side of said rim part having a groove partially encasing said lens bar, a lens, means for detachably securing the lens to the lens bar comprising an elongated resilient strip connected at one end to the upper side of the lens bar and lying substantially parallel to the temporal portion thereof within the groove in the rim part, an inwardly projecting arm connected to the temporal end of the resilient strip in overlying relation to the hinge plate, a clip connected to the arm and projecting into engaging relation with a notch in the temporal portion of the lens and a second clip projecting inwardly from the bridge portion of the lens bar for engaging with a notch in the bridge portion of the lens whereby a lens is held on the lens bar by the resilience of the elongated strip.

No references cited.